3,332,769
METHOD OF ELIMINATING GERMINATING AND
SEEDLING WEED GRASSES AND BROADLEAF
WEEDS
Quentin F. Soper, Indianapolis, Ind., assignor to Eli Lilly
and Company, Indianapolis, Ind., a corporation of
Indiana
No Drawing. Filed Oct. 7, 1963, Ser. No. 314,510
The portion of the term of the patent subsequent to
June 21, 1983, has been disclaimed
2 Claims. (Cl. 71—121)

This invention relates to a group of novel dinitroaniline derivatives which have herbicidal action. It also relates to a novel process for eliminating germinating and seedling week grasses and selected broadleaf weeds.

The novel compounds provided by this invention can be represented by Formula I below:

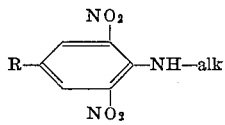

wherein R is a member of the group consisting of hydrogen; $C_1$–$C_3$ alkyl such as methyl, ethyl, n-propyl, or isopropyl; halogen such as chlorine, bromine, fluorine and the like; and $C_1$–$C_3$ haloalkyl such as trichloromethyl, iodomethyl, bromoethyl, pentafluoroethyl, heptafluoro-n-propyl, heptafluoroisopropyl, trifluoromethyl; and alk represents a secondary $C_3$–$C_7$ alkyl group free from quarternary carbon atoms. The radical which alk represents can be formulated in an alternative fashion as follows:

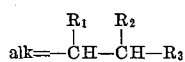

wherein $R_1$ is a member of the group consisting of methyl, ethyl, isopropyl, n-propyl, n-butyl, sec.-butyl, and isobutyl, and $R_2$ and $R_3$ each represents hydrogen plus the same group of alkyl radicals as $R_1$, subject to the restriction that the total number of carbons in $R_1$, $R_2$, and $R_3$ is five or less. Illustrative groupings which alk can represent thus include: isopropyl, sec.-butyl, 2-pentyl, 3-pentyl, 2-hexyl, 3-hexyl, 2-heptyl, 3-heptyl, 4-heptyl, 3-methyl-2-butyl, 3-methyl-2-pentyl, 4-methyl-3-hexyl, 3,4-dimethyl-2-pentyl, 3-methyl-2-hexyl, 4-methyl-2-hexyl, 5-methyl-2-hexyl, and the like.

Illustrative compounds falling within the scope of Formula I above include the following:

N-(sec.-butyl)-2,6-dinitro-4-fluoroaniline
N-(3-pentyl)-2,6-dinitro-4-trifluoromethylaniline
N-(isopropyl)-2,6-dinitro-4-chloroaniline
N-4-(di-isopropyl)-2,6-dinitroaniline
N-(4-methyl-3-hexyl)-2,6-dinitro-4-bromoaniline
N-(2-heptyl)-2,6-dinitro-p-toluidine
N-(4-methyl-2-pentyl)-2,6-dinitro-4-ethylaniline
N-(isopropyl)-2,6-dinitroaniline
N-(3-pentyl)-2,6-dinitroaniline The compounds of this invention are useful in that they selectively kill germinating and seedling weed grasses and broad-leaf weeds either in the presence of crop plants in the seedling or mature stage of growth or in the presence of grasses in the mature stage of growth, i.e., turfs.

Of particular utility as selective herbicides are compounds represented by the following formula:

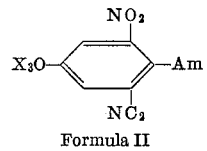

Formula II wherein X can be hydrogen or fluorine and Am can be sec.-butylamino, 3-pentylamino, 2-pentylamino, 3-hexylamino, 2-hexylamino, 3-methyl-2-pentylamino, 4-methyl-2-pentylamino, 2-methyl-3-pentylamino, and 3-methyl-2-butylamino. Compounds represented by Formula II above are particularly useful in that they show an exceptional degree of selectivity with regard to their ability to kill seedling and germinating weed grasses in the presence of seedling or germinating crop plants, mature crop plants, or mature grasses. Furthermore, they possess a greater margin of safety between that application rate which kills seedling and germinating weed grasses and that which damages crop plants or mature grasses. For example, N - (3-pentyl)-2,6-dinitro-4-trifluoromethylaniline will eliminate seedling weed grasses from snapbean fields when applied at a rate which is one-fourth or less than that of the toxic application rate for snapbeans.

Other compounds represented by the above formula show similar specific favorable ratios between that application rate which is toxic for the seedling grass weed and that which is toxic for the desirable plant. The compounds represented by Formula II, like others included within the scope of this invention, also have a herbicidal effect upon many broadleaf weeds in either the seedling or mature stage of growth when applied to a locus infested with weed seeds. All in all, the compounds represented by Formula II above constitute a preferred class for the purposes of selectively killing seedling and germinating weed grasses and selected broadleaf weeds, as provided by this invention.

As previously stated, the compounds of this invention are useful in that they can selectively kill germinating and seedling weed grasses in the presence of mature grasses or of crop plants. Thus, for example, the compounds can be employed to eliminate weed grass seedlings from lawns. The compounds can also be employed with considerable safety for the purpose of eliminating seedling weed grasses from crop growing areas such as soybean fields, strawberry beds, cotton fields, peanut fields, tobacco fields, etc.

The compounds are also useful in that they can be used to eliminate broadleaf weeds in various stages of growth from an area infested with such weeds or weed seeds. Among the broadleaf weeds which can be thus eliminated from areas infested therewith are included particularly members of the genus Amaranthus such as pigweed, the genus Polygonum such as smart weed, the genus Chenopodium such as lambsquarter, the genus Stellaria such as chickweed, the genus Mollugo such as carpetweed, the genus Salsola such as Russian thistle, as well as members of the following genera: Kochia, Galinsoga, and Portulaca.

The herbicidal processes of this invention comprise applying a herbicidally effective amount of a compound coming within the scope of Formula I above to an area infested with seedling or germinating weed grasses, grass weeds, or broadleaf weed seeds, or broadleaf weeds either in the seedling or mature stage of growth. The compounds preferably are formulated for herbicidal use either as sprays made up by adding water to emulsifiable concentrates or wettable powders, or as granules or as dispersions on carriers such as attapulgite clay granules, peat moss, fertilizer, vermiculite, etc. The compounds are quite insoluble in water, and hence, for the preparation of emulsions or wettable powders, the compounds are preferably formulated with wetting agents.

Herbicidal formulations containing a compound represented by Formula I above as the active ingredient, can be used to eliminate seedling or germinating weed grasses and broadleaf weeds in various stages of growth from such as gravel walks, shoulders of roads, fence rows, flower gardens, drainage ditches, woodland areas, and the like. The formulations can also be applied to crop-bearing areas. It is a considerable advantage of the process of this invention that herbicidal formulations of the N-sec.-alkyl-2,6-dinitroanilines as defined above do not affect the growth of the crop plant either in the seedling or mature stages of growth at concentrations which virtually eliminate germinating and seedling grasses and broadleaf weeds from an area infested therewith. Thus, the herbicidal compositions of this invention can be applied to crops either in the pre- or post-emergent stage of growth although, in general, there is less likelihood of damage to the crops if the compounds are applied post-emergent to the crop. Among the crop plants, in addition to those previously listed, which will tolerate concentrations of a N-sec.-alkyl-2,6-dinitroaniline sufficient to kill germinating and seedling grasses and broadleaf weeds are the following: Great Northern beans, kidney beans, navy beans, cowpeas, safflower, peppers, peanuts, celery, snapbeans, cabbage, carrots, lima beans, green peas, parsnips, okra, sunflowers, sweet potatoes, and related species. In addition, with many of the grass crop plants (monocotyledonous), there is a rate of application of a herbicidal composition prepared according to this invention which will eliminate many of the germinating and seedling grass weeds and broadleaf weeds from the crop area without affecting the growth of the crop plant.

The herbicidal compositions of this invention containing an N-sec.-alkyl-2,6-dinitroaniline as the active ingredient can be applied to the crop area for the purpose of eliminating seedling weed grasses and broadleaf weeds from that area, either by in-row or broadcast treatment either at the time of planting or as a lay-by treatment after the crop has passed the seedling stage of growth. It is also possible to apply compositions of this invention between the rows of plants which are themselves quite susceptible to the herbicidal action of the compositions. The type of treatment chosen depends upon cost and upon the type of damage to the plant to be expected from an overdose of the herbicide, as well as other factors.

Herbicidal compositions containing a compound coming within the scope of one of the above formulas as its active ingredient can be employed by the processes of this invention to eliminate the following grasses in the seedling stage from an area infested therewith: Undesirable grasses such as the crabgrasses (*Digitaria sanguinalis* and *Digitaria ischaemum*); green, yellow, and giant foxtails (*Setaria viridis, Setaria glauca* and *Setaria faberii*); Johnson grass (*Sorghum halepense*); goosegrass (*Eleusine indicia*); sandbur (*Cenchrus pauciflorus*); witchgrass (*Panicum capillare*); and the like, as well as the seedlings of desirable grasses as as oats (*Avena sativa*); Bermuda grass (*Cynodon dactylon*); Kentucky bluegrass (*Poa pratensis*); bentgrass (*Agrostis tenuis*); fescues (*Festuca sp.*); orchard grass (*Dactylis glomerata*); red top (*Agrostis alba*); sorghum (*Sorghum vulgaris*); German millet (*Setaria italica*); Japanese millet (*Echinochloa crusgalli var. frumbentacea*); and the like. Illustratively, the herbicidal composition of this invention can be used to eliminate any of the above weed grasses, in the germinating or seedling stage of growth, from established lawns containing desirable grasses such as bluegrass, zoysia, St. Augustine grass, bentgrass, fescue, and Bermuda grass. It is a further advantage of the processes of this invention that there is a large difference between the ability of grasses in the germinating or seedling stages of growth on the one hand and in the mature stage of growth on the other to withstand the herbicidal effects of the N-sec.-alkyl-2,6-dinitroanilines employed in such herbicidal processes, so that these compounds can safely be used to eliminate weed grasses from areas where the desirable grass is established.

The herbicidal compositions of this invention are applied to those areas wherein it is desired to eliminate seedling grass weeds and broadleaf plants at rates varying from 0.1 to 20 lbs. per acre depending upon the nature of the area itself. For example, excessive amounts of even the most active herbicidal N-sec.-alkyl-2,6-dinitroaniline can be applied to driveways, road sides, etc., since there is no question of an overdose harming desirable plants. For lawns and crop-bearing areas, it is necessary to chose an application rate of the N-sec.-alkyl-2,6-dinitroaniline which will give maximal elimination of seedling or germinating weed grasses or broadleaf weeds without harming the lawn or crop.

The ability of the compositions of this invention to kill germinating and seedling weed grasses and broadleaf weeds without harming turfs or crop plants was demonstrated by the following experimental procedure: A soil was prepared consisting of one part masonry sand and one part shredded top soil blended together in a cement mixer. One gallon of this soil was placed in a 25 x 35 cm. galvanized flat and was patted down with a bench brush until level. A three-row marker was used to make 2½ cm. deep furrows in approximately two-fifths of the flat. Crop seeds consisting of four kernels of corn, five cotton seeds and five soybean seeds were placed in these furrows. A four-row template was then placed on the remaining soil, and the indicated amounts of each of the following seeds were planted, one species to each section: German millet, 100 mg.; broadleaf mustard (*Brassica juncea*), 50–75 mg.; rough pigweed, 30–50 mg.; and large crabgrass, 350–400 mg. Sufficient soil was added to cover the entire flat. Thus, the weed seeds were covered to a depth of about 6 mm. and the crop plant seeds were covered to a depth of about 3 cm.

In assaying the effect of the compositions as preemergent herbicides, a flat prepared as above, taken either on the day of planting or on the next day, was placed in a chamber equipped with a turntable and an air exhaust. The herbicidal composition, whether it was a spray-type emulsion or a dispersed powder, was applied to the flat with a modified DeVilbiss atomizer hooked to an air source. Twelve and one-half ml. of the composition under test were applied to each flat either on the day of planting or the succeeding day. Injury ratings and observations as to type of injury were made in either case eleven to twelve days after treatment. The injury rating scale used was as follows:

0—No injury
1—Slight injury
2—Moderate injury
3—Severe injury
4—Death

When more than one determination was carried out, an average value was calculated for the injury rating.

The following table sets forth the results of preemergent testing of many N-sec.-alkyl-2,6-dinitroaniline compounds. In the table, Column 1 gives the name of the compound; Column 2 the rate in terms of pounds per acre at which the compound was applied to the test flat; and the succeeding columns, the injury rating for the particular plant seeds or seedlings.

to certain of the plots at rates varying from ½ to 6 lbs./acre. Other plots were not treated and kept as a control area. The choice of which plot received herbicide at a particular rate was made in accordance with standard

TABLE I.—INJURY RATING ON PRE-EMERGENT TREATMENT

| Compound | Lbs./Acre | Corn | Cotton | Soybean | Crabgrass | Mustard | Pigweed | Foxtail Millet |
|---|---|---|---|---|---|---|---|---|
| N-(3-methyl-2-butyl)-2,6-dinitro-4-trifluoromethylaniline. | 8 | 0.5 | 0 | 0 | 4 | 1 | 4 | 4 |
|  | 4 | 0 | 0 | 0 | 4 | 1 | 4 | 4 |
|  | 2 | 0 | 0 | 0 | 2.5 | .5 | 1 | 3 |
| N-(2-hexyl)-2,6-dinitro-4-trifluoromethylaniline. | 8 | 1.5 | 0.5 | 0.5 | 4 | 1 | 2 | 3 |
|  | 4 | 0 | 0 | 0 | 3 | 1 | 1 | 3 |
|  | 2 | 0 | 0 | 0 | 3 | 1 | 1 | 2 |
| N-(2-pentyl)-2,6-dinitro-4-trifluoromethylaniline. | 8 | 1.5 | .5 | .5 | 4 | 1 | 3 | 4 |
|  | 4 | 0 | 0 | 0 | 4 | 1 | 3 | 4 |
|  | 2 | 0 | 0 | 0 | 4 | 1 | 2 | 3 |
|  | 1 | 0 | 0 | 0 | 3 | 0 | 0 | 2 |
|  | .5 | 0 | 0 | 0 | 2 | 0 | 0 | 1 |
| N-(sec.-butyl)-2,6-dinitro-4-trifluoromethylaniline. | 8 | 1.7 | .3 | 1 | 4 | 2 | 4 | 4 |
|  | 4 | 1 | 0 | .5 | 4 | 1.5 | 4 | 4 |
|  | 2 | .3 | 0 | 0 | 4 | .5 | 3 | 3 |
|  | 1 | 0 | 0 | 0 | 3 | 0 | 1.5 | 2 |
|  | .5 | 0 | 0 | 0 | 3 | 0 | 0 | 0 |
| N-(3-hexyl)-2,6-dinitro-4-trifluoromethylaniline. | 8 | 0 | 0 | 0 | 4 | 1 | 4 | 4 |
|  | 4 | 0 | 0 | 0 | 3 | 0 | 3 | 3 |
|  | 2 | 0 | 0 | 0 | 3 | 0 | 1 | 3 |
| N-(3-methyl-2-pentyl)-2,6-dinitro-4-trifluoromethylaniline. | 8 | 0 | 0 | 0 | 4 | 2 | 4 | 3 |
|  | 4 | 0 | 0 | 0 | 3 | 0 | 1 | 3 |
|  | 2 | 0 | 0 | 0 | 3 | 0 | 1 | .1 |
| N-(4-methyl-2-hexyl)-2,6-dinitro-4-trifluoromethylaniline. | 8 | 0 | 0 | 0 | 4 | 1 | 3 | 3 |
|  | 4 | 0 | 0 | 0 | 2 | 0 | 0 | 0 |
|  | 2 | 0 | 0 | 0 | 2 | 0 | 0 | 0 |
| N-(4-heptyl)-2,6-dinitro-4-trifluoromethylaniline. | 8 | 2 | 0 | 1 | 4 | 1 | 4 | 3 |
|  | 4 | 2 | 0 | 0 | 4 | 1 | 3 | 3 |
|  | 2 | 0 | 0 | 0 | 3 | 1 | 2 | 2 |
|  | 1 | 0 | 0 | 0 | 2 | 1 | 1 | 2 |
| N-(3-pentyl)-2,6-dinitro-4-trifluoromethylaniline. | 8 | 3 | 1.5 | 1 | 4 | 2.5 | 4 | 4 |
|  | 4 | 3 | 1 | 0 | 4 | 2 | 4 | 4 |
|  | 2 | 2.5 | 0 | 0 | 4 | .5 | 3.5 | 3.5 |
|  | 1 | .5 | 0 | 0 | 4 | 0 | 3.5 | 3.5 |
|  | .5 | 0 | 0 | 0 | 3.5 | 0 | 3 | 3 |
|  | .2 | 0 | 0 | 0 | 3 | 0 | 2 | 3 |
| N-(4-heptyl)-2,6-dinitro-p-toluidine | 8 | 0 | 0 | 0 | 4 | 2 | 3.5 | 3.5 |
|  | 4 | 0 | 0 | 0 | 4 | 2 | 3 | 2 |
|  | 2 | 0 | 0 | 0 | 4 | 0 | 2 | 1 |
| N-(3-pentyl)-2,6-dinitro-p-toluidine | 8 | 0 | 0 | 0 | 4 | 3 | 4 | 4 |
|  | 4 | 0 | 0 | 0 | 4 | 3 | 4 | 4 |
|  | 2 | 0 | 0 | 0 | 4 | 0 | 3 | 3 |

For measuring the efficacy of representative N-sec.-alkyl-2,6-dinitroanilines of this invention as post-emergent herbicides, the same experimental procedure was employed as in the preemergent evaluation described above except that the flats were sprayed from nine to twelve days after the seeds were planted. The results are reported on the same basis as in Table I and are recorded in Table II which follows:

randomizing procedures. Five to ten minutes after the herbicide had been applied, the area was rotovated so that the herbicide as present was incorporated into the soil at a depth of two inches. The entire area was then seeded to a particular crop and the percent weed control and amount of crop damage observed at monthly or bi-monthly intervals thereafter. The percent weed control was determined by counting the number of weeds, either as grass

TABLE II.—INJURY RATING ON POST-EMERGENT TREATMENT

| Compound | Lbs./Acre | Corn | Cotton | Soybean | Crabgrass | Mustard | Pigweed | Foxtail Millet |
|---|---|---|---|---|---|---|---|---|
| N-(3-methyl-2-butyl)-2,6-dinitro-4-trifluoromethylaniline | 8 | 0 | 0 | 0 | 2 | 1 | 2 | 2 |
| N-(2-hexyl)-2,6-dinitro-4-trifluoromethylaniline | 8 | 0 | 0 | 1 | 2 | 2 | 1 | 0 |
| N-(2-pentyl)-2,6-dinitro-4-trifluoromethylaniline | 8 | 0 | 0 | 1 | 2 | 2 | 1 | 2 |
| N-(sec.-butyl)-2,6-dinitro-4-trifluoromethylaniline | 8 | 0 | 0 | 0.5 | 2 | 1 | 0.5 | 0.5 |
| N-(3-hexyl)-2,6-dinitro-4-trifluoromethylaniline | 8 | 0 | 0 | 1 | 1 | .0 | 0 | 0 |
| N-(3-methyl-2-pentyl)-2,6-dinitro-4-trifluoromethylaniline | 8 | 1 | 1 | 0 | 0 | 1 | 0 | 0 |
| N-(4-methyl-2-hexyl)-2,6-dinitro-4-trifluoromethylaniline | 8 | 0 | 0 | 0 | 0 | 0 | 0 | 0 |
| N-(5-methyl-2-hexyl)-2,6-dinitro-4-trifluoromethylaniline | 8 | 0 | 0 | 0 | 1 | 1 | 0 | 0 |
| N-(4-heptyl)-2,6-dinitro-4-trifluoromethylaniline | 8 | 0 | 0 | 0 | 3 | 1 | 1 | 1 |
|  | 4 | 0 | 0 | 0 | 2 | 1 | 1 | 1 |
|  | 2 | 0 | 0 | 0 | 2 | 0 | 0 | 0 |
|  | 1 | 0 | 0 | 0 | 0 | 0 | 0 | 0 |
| N-(3-pentyl)-2,6-dinitro-4-trifluoromethylaniline | 8 | 0 | 0 | 0 | 1 | 0 | 0 | 0 |
| N-(4-heptyl)-2,6-dinitro-4-trifluoromethylaniline | 8 | 0 | 0 | 1 | 0 | 1 | 0 | 0 |

One of the compounds of this invention N-(3-pentyl)-2,6-dinitro-4-trifluoromethylaniline has been extensively tested in the field for its ability to control grass and broadleaf weeds in areas planted to crops. In carrying out these field trials, a field suitable for growing the particular crop was divided into plots. The herbicide was applied or broadleaf in 5 quadrats of the treated plot and then dividing this number by the number of grass or broadleaf weeds growing in 5 quadrats of one or more adjacent control plots.

Table III which follows gives the results of a field trial using celery as the crop plant. In the table, Column 1 gives the application rate, Columns 2 and 3, the percent weed control for grasses and pigweed (respectively). The weed count was made 25 days after the treatment date.

TABLE III.—WEED CONTROL IN CELERY

| Rate (lb./acre) | Percent Weed Control | |
|---|---|---|
| | Grass | Pigweed |
| 0 | 0 | 0 |
| ½ | 90 | 59 |
| 1 | 97 | 93 |
| 2 | 100 | 100 |

Injury rating was not determined in this field trial because of very poor germination of celery seed in all the plots.

A similar experiment was carried out using peanuts as the test crop. Table IV records results of this experiment. In the table, Column 1 gives the application rate, Columns 2 and 3 the percent weed control against grasses (crabgrass, foxtail, and stinkgrass) and broadleaf weeds (pigweed, lambsquarters, and carpetweed,) respectively. Column 4 gives the crop injury rating (on a scale from 0=no injury to 10=death) as measured 35 days after treatment. Column 5 gives the crop injury rating as observed 95 days after treatment.

TABLE IV.—WEED CONTROL AND CROP INJURY RATING IN PEANUT FIELDS

| Rate (lb./acre) | Percent Weed Control | | Crop Injury Rating at— | |
|---|---|---|---|---|
| | Grass | Broadleaf | 35 Days | 95 Days |
| 1 | 100 | 100 | 0 | 0 |
| 2 | 100 | 100 | 0.6 | 0 |
| 3 | 100 | 100 | 3.3 | 3.3 |
| 4 | 100 | 100 | 2.3 | 2.7 |
| 6 | 100 | 100 | 6 | 7.7 |

A similar field trial was carried out by applying the herbicide at various rates to plots which were later seeded to snapbeans. Table V gives the results of this field trial. In the table, Column 1 gives the application rate, Column 2 the percent weed control for grass weeds (chiefly German millet) and Column 3, the crop injury rating. The observations were made 26 days after treatment.

TABLE V.—GRASS WEED CONTROL AND CROP INJURY IN A SNAPBEAN FIELD

| Rate (lb./acre) | Percent Grass Control | Crop Injury Rating |
|---|---|---|
| ½ | 94 | 0 |
| 1 | 98 | 0 |
| 2 | 99 | 0 |

A similar experiment was carried out in an area seeded to cotton. Table VI records the results of this field trial. In the table, Column 1 gives the application rate, Column 2 the percent weed control for grass (chiefly German millet) and Column 3, the crop injury rating. The observations were made 20 days after treatment.

TABLE VI.—GRASS WEED CONTROL AND CROP INJURY IN COTTON

| Rate (lb./acre) | Percent Grass Weed Control | Crop Injury Rating |
|---|---|---|
| ½ | 77 | 1 |
| 1 | 94 | 1 |
| 2 | 100 | 1 |

An analogous field trial was carried out using an area later seeded to green peas. Table VII below records the results of this field trial. In the table, Column 1 gives the application rate, Column 2 the percent weed control for German millet, Column 3 the pea injury rating. The observations upon which the data in this table are based were made 21 days after treatment.

TABLE VII.—GRASS WEED CONTROL AND CROP INJURY IN GREEN PEA FIELD

| Rate (lb./acre) | Percent Grass Weed Control | Crop Injury Rating |
|---|---|---|
| 1 | 93 | 0 |
| 2 | 99 | 4 |
| 4 | 99 | 5 |

The N-sec.-alkyl-2,6-dinitroanilines represented by Formula I above can be formulated in the variety of ways for application to soil areas. Among these herbicidal formulations are included wettable powders, emulsifiable concentrates, and solid formulations on selected carriers. The formulations can also include other herbicides (for killing mature grasses and dicotyledonous plants), insecticides, miticides, etc. Typical formulations are set forth below using N-(3-pentyl)-2,6-dinitro-4-trifluoromethylaniline as the active ingredient for illustrative purposes only.

FORMULATIONS

*Solid formulation on fertilizer*

The active ingredients were dissolved in an aromatic naphtha solvent and deposited upon a 4–12–4 fertilizer to give a dry spreadable formulation having the following active ingredients in percentage by weight.

| | Percent |
|---|---|
| N - (3-pentyl)-2,6-dinitro-4-trifluoromethylaniline | .184 |
| Heptachlor and related compounds | .125 |

Other typical formulations are listed below in terms of total content of N-(3-pentyl)-2,6-dinitro-4-trifluoromethylaniline and inert ingredients.

A. *Granular formulations*

(1)

| | Percent |
|---|---|
| N-(3-pentyl)-2,6-dinitro - 4 - trifluoromethylaniline | 5.0 |
| Aromatic petroleum distillate | 6.0 |
| Granular clay (e.g. attapulgite, montmorillonite) | 89.0 |

(2)

| | |
|---|---|
| N - (3-pentyl)-2,6-dinitro - 4 - trifluoromethylaniline | 1.0 |
| Aromatic petroleum distillate | 4.0 |
| No. 4 vermiculite | 95.0 |

(3)

| | |
|---|---|
| N - (3-pentyl)-2,6-dinitro - 4 - trifluoromethylaniline | 5.0 |
| Aromatic petroleum distillate | 6.0 |
| Diatomaceous earth | 89.0 |

(4)

| | |
|---|---|
| N - (3-pentyl)-2,6-dinitro - 4 - trifluoromethylaniline | 5.0 |
| Aromatic petroleum distillate | 4.0 |
| Ethylene oxide adduct of nonylphenol | 7.5 |
| Granular clay | 83.5 |

(5)

| | |
|---|---|
| N - (3-pentyl)-2,6-dinitro - 4 - trifluoromethylaniline | 2.0 |
| Aromatic petroleum distillate | 3.5 |
| Corn cob grit | 94.5 |

B. Liquid concentrate formulations (1)

| | |
|---|---|
| N-(3 - pentyl)-2,6-dinitro - 4 - trifluoromethylaniline | 46–49 |
| Emulsifier | 5 |
| Xylene range solvent | 46–49 |

(2)

| | |
|---|---|
| N-(3 - pentyl) - 2,6 - dinitro-4-trifluoromethylaniline | 43–46 |
| Emulsifier | 7 |
| Heavy aromatic naphtha | 47–50 |

C. Water dispersible dry powder

| | |
|---|---|
| N-(3 - pentyl) - 2,6 - dinitro-4-trifluoromethylaniline | 20 |
| Ethylene oxide adduct of octylphenol | 2 |
| Lignin sulfonate | 2 |
| Hydrated silica | 76 |

In the above liquid formulations, the emulsifier can be any suitable anionic or non-ionic surfactant or a mixture of these two types of surfactants. Typical of the latter are blends containing three parts of the calcium salt of myristylbenzene sulfonic acid to one part of the oleate ester of a polyoxyethylene glycol (MW=350) or seven parts of the calcium salt of laurylphenolsulfonic acid to three parts of mono- and di-resin acid esters of polyoxyethylene glycol (MW=500). Other non-ionic surfactants which are commonly blended with the anionic surfactants listed above include polyoxyethylene sorbitan monolaurate. A particularly useful emulsifier combination for use in the liquid formulation No. 3 above includes 2.1% of an alkylarylsulfonate and 4.9% of an anionic/non-ionic surfactant mixture containing a magnesium salt of a cetylphenolsulfonic acid and a mono- and di-resin acid ester of a polyoxyethylene glycol (MW=400). Other suitable emulsifiers will readily suggest themselves to those skilled in the art.

Compounds represented by the above formula are in general low melting solids or heavy viscous oils, having a yellow to orange color depending on the particular substituent groups present. They are prepared by reacting a primary amine ($NH_2$-alk) with a 2,6-dinitrochlorobenzene. A chlorine ortho to two nitro groups in a benzene ring is, of course, highly activated and, therefore, 2,6-dinitrochlorobenzenes, particularly those having a substituent in the four position of the benzene ring, readily alkylate primary amines. Thus heating a 2,6-dinitrochlorobenzene with a primary amine in the presence of an inert solvent results in the formation of the desired 2,6-dinitroaniline derivative. If the amine employed in the reaction is relatively difficult to obtain, I customarily add a strongly basic tertiary amine to react with the hydrogen chloride produced as a by-product in the above reaction. If the reacting amine, however, is readily available, it not only can be employed to react with the by-product hydrogen chloride but can even be used as a solvent.

The following examples further exemplify the compounds of this invention and methods of preparing them:

EXAMPLE 1

N-(4-heptyl)-2,6-dinitro-4-trifluoromethylaniline

A reaction mixture was prepared from the following materials: 5.4 g. of 4-chloro-3,5-dinitrobenzotrifluoride, 5.5 ml. of triethylamine, 4.6 g. of 4-aminoheptane, and 50 ml. of benzene. The reaction mixture was heated to refluxing temperature for 2 hours and was then filtered to remove the amine salts formed as a by-product of the reaction. The filtrate was evaporated to dryness in vacuo and the resulting residue dissolved in pentane. The pentane solution was cooled and again filtered to remove more amine salts. The filtrate was evaporated to dryness in vacuo. The resulting oily residue consisted of N-(4-heptyl)-2,6-dinitro-4-trifluoromethylaniline.

*Analysis.*—Calc.: N, 12.03. Found: N, 12.02.

Following the above procedure, 4-chloro-3,5-dinitrobenzotrifluoride was reacted with 3-pentylamine in the presence of triethylamine to yield N-(3-pentyl)-2,6-dinitro-4-trifluoromethylaniline which melted at about 71–73° C. after recrystallization from pentane.

*Analysis.*—Calc.: N, 13.08. Found: N, 12.79.

EXAMPLE 2

N-(sec.butyl)-2,6-dinitro-4-trifluoromethylaniline

A reaction mixture was prepared from the following materials: 5.4 g. of 4-chloro-3,5-dinitrobenzotrifluoride, 10 ml. of sec.-butylamine, and 50 ml. of benzene. The reaction mixture was heated to refluxing temperature for about two hours. Fifty ml. of ether were added. The organic layer was washed with 25 ml. of water followed by 25 ml. of 10 percent hydrochloric acid and again by 25 ml. of water. The organic layer was separated and dried and the solvent removed by evaporation in vacuo. The residue was crysallized from hexane. N-(sec.butyl)-2,6-dinitro-4-trifluoromethylaniline thus prepared melted in the range 69.5–71.5° C.

*Analysis.*—Calc.: N, 13.68. Found: N, 13.47.

By substituting 2-pentylamine for isobutylamine, the above procedure was employed to prepare N-(2-pentyl)-2,6-dinitro-4-trifluoromethylaniline which melted at about 32–34° C. after recrystallization from pentane.

*Analysis.*—Calc.: N, 13.08. Found: N, 12.80.

Other compounds prepared by using the same procedure are listed in Table VIII below: A generic formula has been provided for these compounds and Column 1 of the table lists the substituents represented by alk in the generic formula. The other columns in the table contain information as to the melting point of the compound if crystalline, the crystallization solvent used, and analytical data supporting the postulated structure.

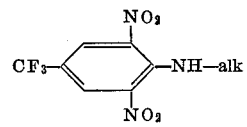

TABLE VIII

| Alk | Melting point, °C. | Solvent | Analysis calculated | Found |
|---|---|---|---|---|
| 2-hexyl | Oil | | 12.53 | 12.55 |
| 2-heptyl | Oil | | 12.03 | 11.85 |
| 4-methyl-2-hexyl | Oil | | 12.03 | 11.78 |
| 3-methyl-2-butyl | 62–63 | Hexane–pentane. | 13.08 | 13.21 |
| 3-hexyl | Oil | Pentane | 12.53 | 12.48 |
| 3-methyl-2-pentyl | 38–40 | ___do___ | 12.53 | 12.56 |

N-(3-methyl-2-hexyl)- and N-(5-methyl-2-hexyl)-2,6-dinitro-4-trifluoromethylaniline were prepared by the same procedure in pure form, as evidenced by the fact that the preparations yielded only one spot by thin layer chromatography, demonstrating that only a single dinitroaniline was present in each preparation.

EXAMPLE 3

N-(4-heptyl)-2,6-dinitro-p-toluidine

Following the procedure of Example 1, 4-chloro-3,5-dinitrotoluene and 4-heptylamine were reacted in the presence of triethylamine to yield N-(4-heptyl)-2,6-dinitro-p-toluidine which melted in the range 47–49° C. after recrystallization from a pentane-hexane mixture.

*Analysis.*—Calc.: N, 14.23. Found: N, 14.15.

Following the same procedure, 4-chloro-3,5-dinitrotoluene was reacted with 3-pentylamine to yield N-(3-pentyl)-2,6-dinitro-p-toluidine melting in the range 54–56° C. after recrystallization from pentane.

*Analysis.*—Calc.: N, 15.72. Found: N, 15.48.

EXAMPLE 4

N-(isopropyl)-2,6-dinitro-4-chloroaniline

Following the procedure of Example 2, isopropylamine and 2,5-dichloro-1,3-dinitrobenzene were reacted in ethanol solution to yield N-(isopropyl-2,6-dinitro-4-chloroaniline which melted at about 65–67° C. after recrystallization from aqueous ethanol.

*Analysis.*—Calc.: N, 16.18. Found: N, 16.13.

EXAMPLE 5

N-(3-pentyl)-2,6-dinitroaniline

Following the procedure of Example 2, 2,6-dinitrochlorobenzene was reacted with 3-pentylamine in benzene solution to yield N-(3-pentyl)-2,6-dinitroaniline which melted in the range 36–38° C. after recrystallization from hexane.

*Analysis.*—Calc.: N, 16.59. Found: N, 16.39.

I claim:

1. The method of selectively eliminating germinating and seedling weed grasses and germinating and seedling broad-leaf weeds from an area without destroying mature grasses, germinating and seedling crop plants, and mature crop plants therein which comprises applying to said area an effective amount of a herbicidal compound represented by the following formula:

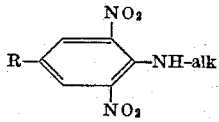

wherein R is a member of the group consisting of hydrogen, $C_1$–$C_3$ alkyl, $C_1$–$C_3$ haloalkyl, and halogen; and alk represents a secondary $C_3$–$C_7$ alkyl group free from quaternary carbon atoms.

2. A process according to claim 1 wherein the herbicidal compound is applied at a rate from 0.1 to 20 lbs./acre.

References Cited

UNITED STATES PATENTS

| | | | |
|---|---|---|---|
| 2,947,784 | 8/1960 | Martin et al. | 260—577 |
| 3,005,026 | 10/1961 | Gordon | 260—577 |
| 3,088,978 | 5/1963 | Brunner et al. | 260—577 X |
| 3,102,803 | 9/1963 | Wilder | 71—2.3 |
| 3,111,403 | 11/1963 | Soper | 71—2.3 |
| 3,119,736 | 1/1964 | Clark et al. | 167—30 |

OTHER REFERENCES

Barche et al., Chemical Abstracts, 1911, vol. 5, pp. 2079.

Hantzsch, Deutsche Chemische Gesellschaft Berichte, 1910, vol. 43, pp. 1662–1685.

Joshi et al., Chemical Abstracts, 1934, vol. 24, page 469.

LEWIS GOTTS, *Primary Examiner.*

JAMES O. THOMAS, JULIAN S. LEVITT, *Examiners.*